United States Patent [19]
Hall et al.

[11] 3,832,835
[45] Sept. 3, 1974

[54] SEVEN GANG HYDRAULIC REEL MOWER

[75] Inventors: George E. Hall, Des Plaines; Jack Carr, Glenview, both of Ill.

[73] Assignee: Roseman Mower Corporation, Glenview, Ill.

[22] Filed: Jan. 8, 1973

[21] Appl. No.: 321,828

[52] U.S. Cl. .......................... 56/7, 56/11.9, 56/15.8
[51] Int. Cl. ............................................ A01d 75/30
[58] Field of Search .......... 56/6, 7, 10.9, 11.9, 13.6, 56/15.8

[56] References Cited
UNITED STATES PATENTS
3,221,482  12/1965  Cowling .............................. 56/15.8
3,248,864  5/1966  Barth ................................. 56/11.9

*Primary Examiner*—Antonio F. Guida
*Attorney, Agent, or Firm*—Kinzer, Plyer, Dorn & McEachran

[57] ABSTRACT

A packaged hydraulically operated gang mower assembly for mounting on an industrial type tractor. The assembly includes a U-shaped frame which connects to the tractor. The mowers are of the reel type and are driven by hydraulic motors. Hydraulically operated arms for raising, lowering the pulling the mowers are mounted on the frame. The side and rear mower arms are each individually raised and lowered. The underneath mower arms are raised and lowered by a single cylinder and piston. The mowers are supported by the ground during cutting operations and are connected to their arms so as to be free to follow the ground undulations both along and across the path of travel. Stability of the mowers during cutting is independent of their connections to their arms and is accomplished by the combination of front caster wheels and a rear roller on each mower. The hydraulic drive motors for the reels are arranged in at least two circuits with the motors in each circuit connected in series. Hydraulic fluid reservoirs for the drive motors are arranged to provide maximum cooling of the hydraulic fluid.

17 Claims, 11 Drawing Figures

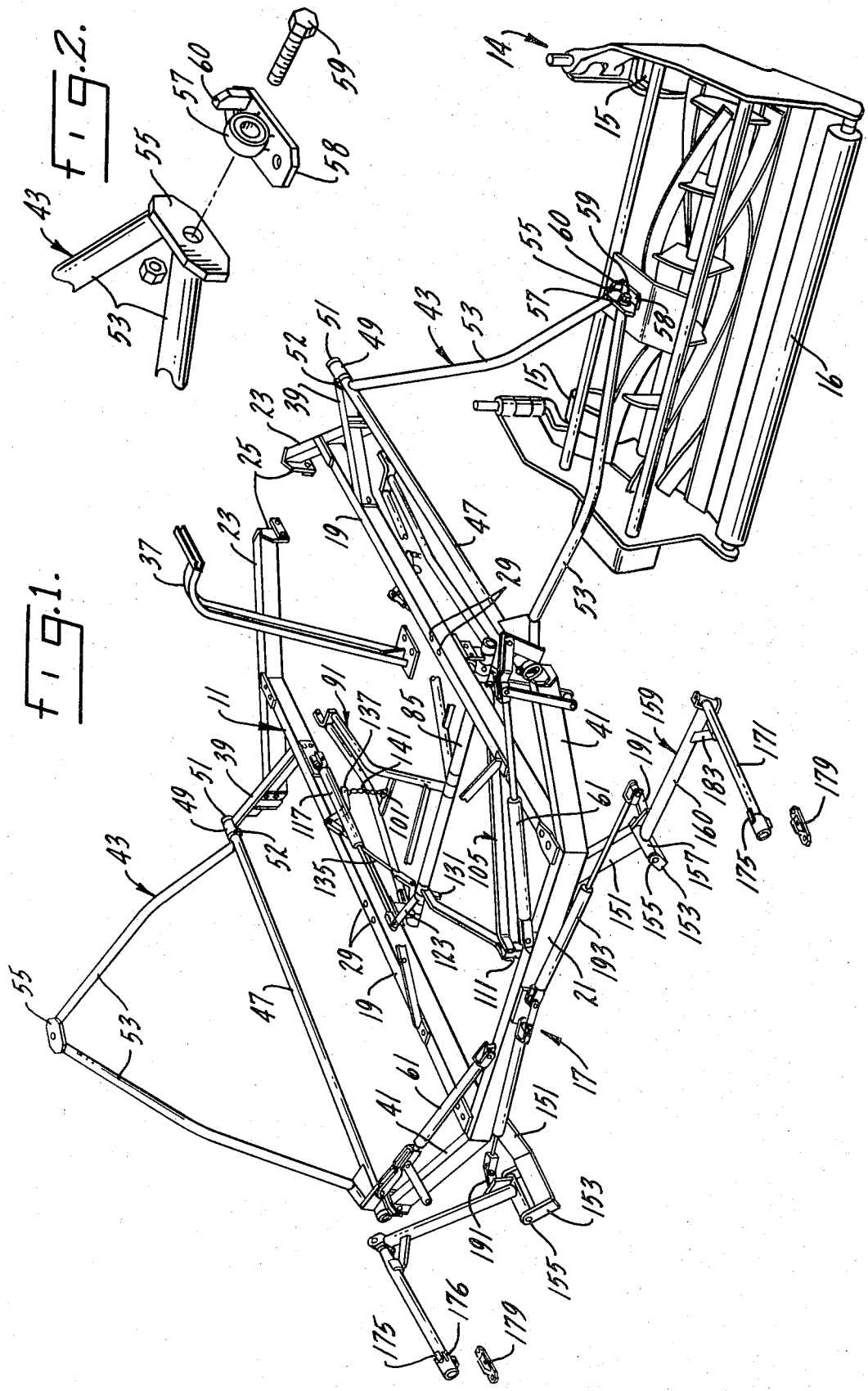

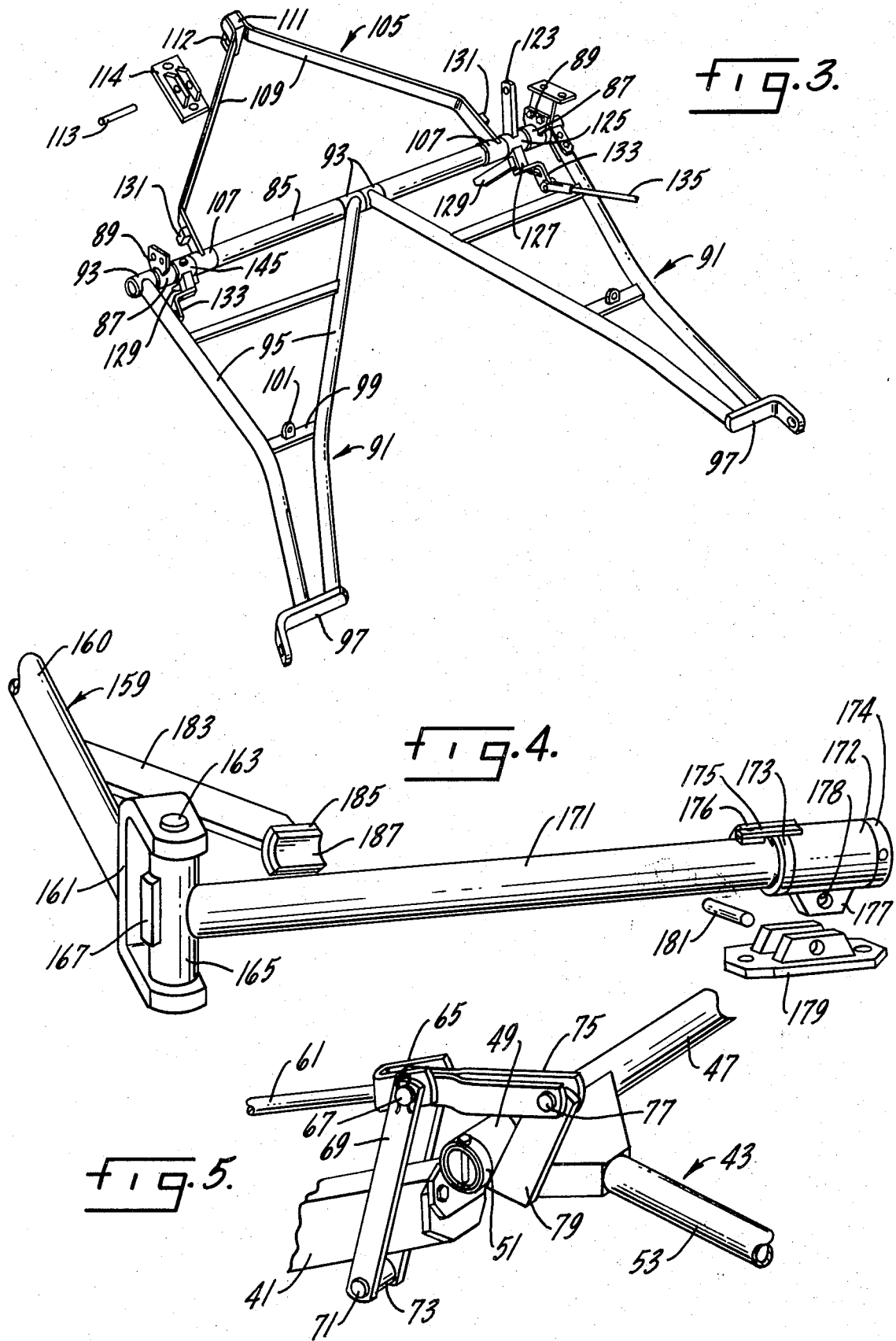

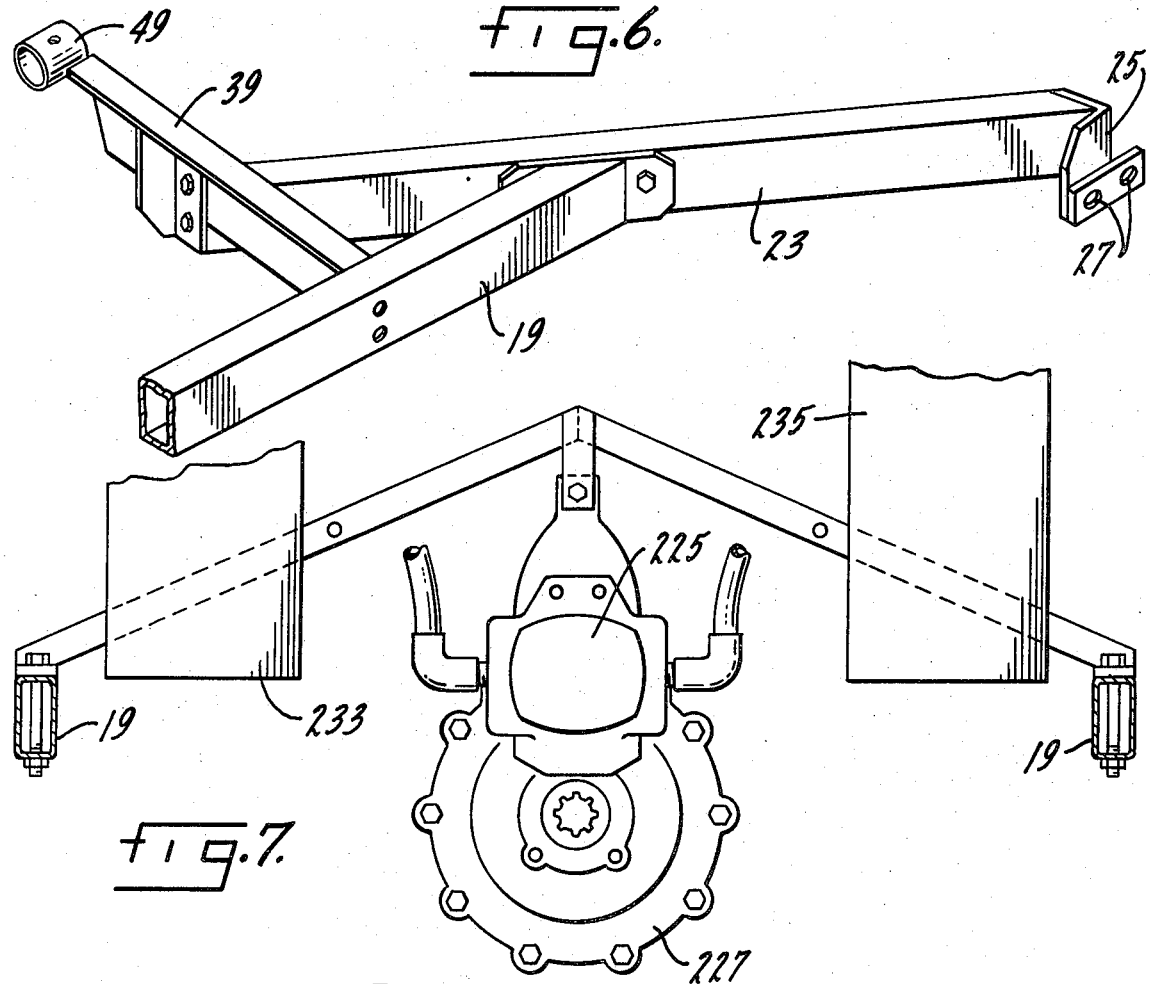
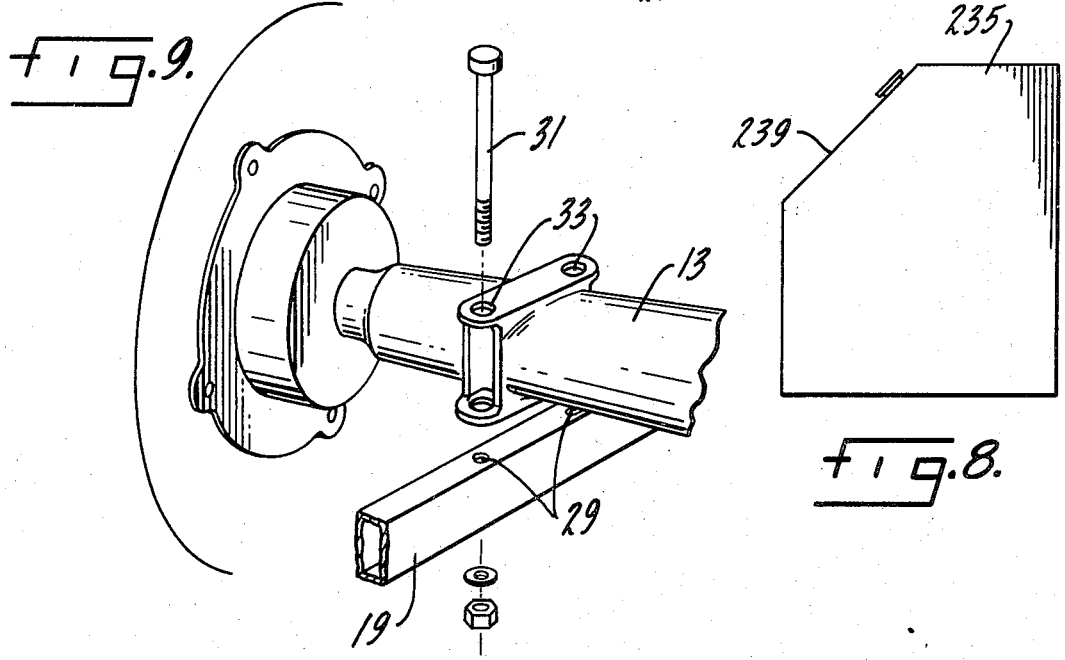

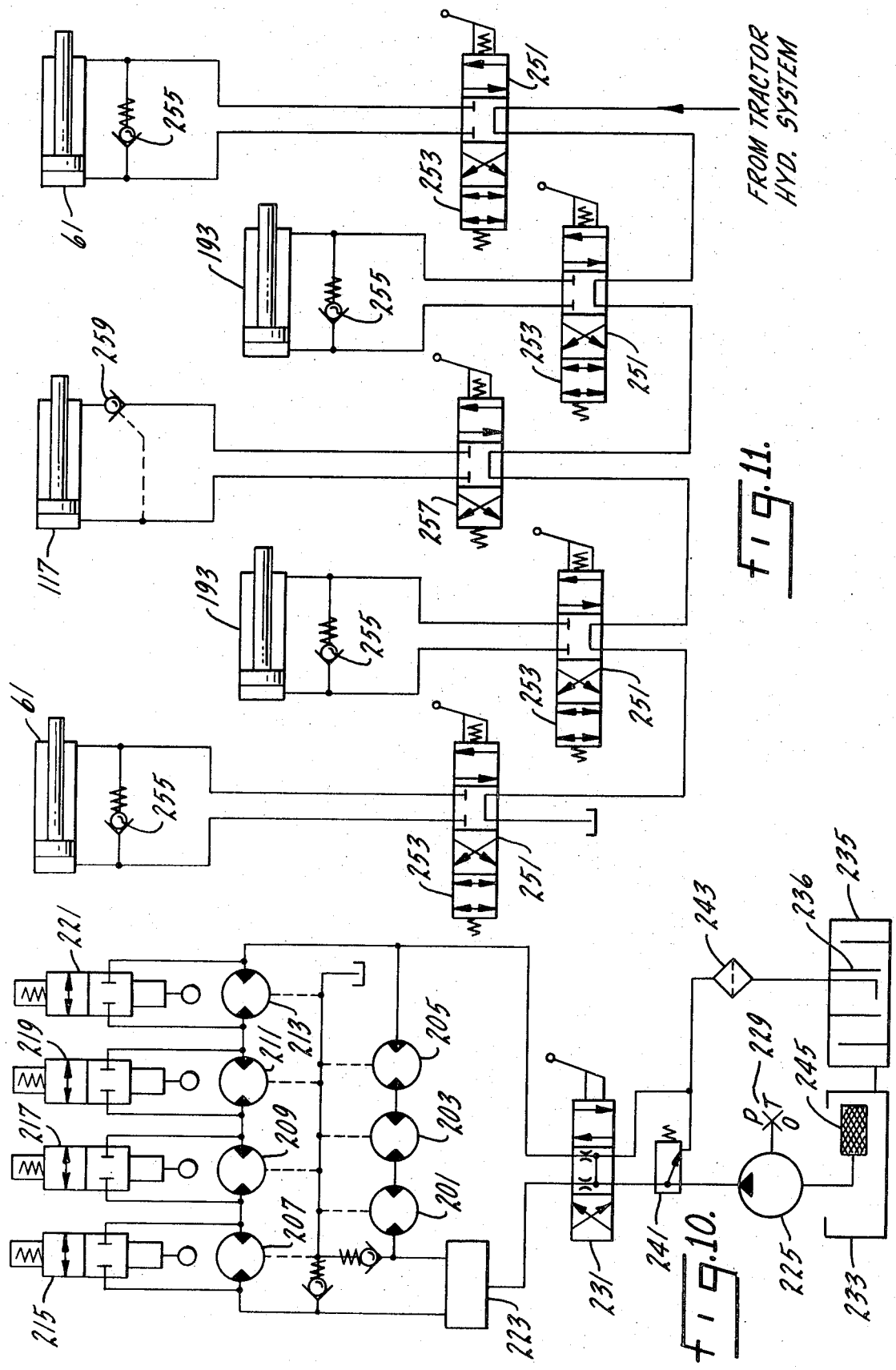

3,832,835

1

SEVEN GANG HYDRAULIC REEL MOWER

SUMMARY OF THE INVENTION

This invention is directed to a packaged hydraulically operated gang reel mower assembly which is mounted on an industrial type tractor.

An object of this invention is a packaged, hydraulically operated gang reel mower assembly which may be easily attached to or removed from an industrial type tractor.

Another object is a packaged gang reel mower assembly in which all of the operating components are mounted on a frame which attaches to an industrial type tractor.

Another object is a motor driven reel mower which closely follows the undulations of the ground being cut both along and across the path of travel of the mower.

Another object is a motor driven reel mower in which the force exerted on the ground by the mower is independent of the distance of the mower from the tractor.

Another object is a motor driven reel mower in which the steering and stability of the mower during cutting is independent of its connection to its lifting arm.

Another object is a lifting and pulling arm for a motor driven reel mower which does not magnify the bouncing of the mower as it goes over bumps or drops during cutting.

Another object is a multigang reel mower which can cut grass at higher speeds than present gang reel mowers.

Another object is a multigang reel mower which is highly manueverable to enable close cutting around trees, shrubbery and other constructions.

Another object is a mower lifting arm which can be operated from an over-center vertical position for travelling to a grass cutting position extending well below the horizontal.

Another object is a gang reel mower assembly having hydraulic motors for the reels located in more than one circuit and supplied by a single pump with means to provide an equal flow of hydraulic fluid in each circuit.

Another object is a hydraulic system for hydraulic motor driven reel mowers which has a limited hydraulic fluid capacity to reduce weight.

Another object is a hydraulic system for hydraulic motor driven reel mowers having a compact and efficient cooling means for the hydraulic fluid.

Another object is a gang reel mower assembly which prevents skipping strips of grass during turns.

Another object is a mounting connection for a gang reel mower which maintains proper trailing of the mowers during the turns.

Other objects may be found in the following specification, claims and drawings.

BRIEF DESCRIPTION OF THE DRAWINGS

The invention is illustrated more or less diagrammatically in the following drawings wherein:

FIG. 1 is a partial perspective view of the gang reel mower assembly of this invention with parts omitted for clarity of illustration;

FIG. 2 is a partial, exploded, enlarged perspective view of a mower arm and a mower ball connection;

FIG. 3 is an enlarged perspective view of the arms for the underneath mowers with some parts broken away and others omitted for clarity of illustration;

FIG. 4 is an enlarged partial perspective view of a rear side mower arm and mower attachment plate;

FIG. 5 is an enlarged partial perspective view of a linkage connecting a side mower arm and its hydraulic piston rod;

FIG. 6 is an enlarged, partial perspective view of one side of the front portion of the frame;

FIG. 7 is an enlarged, partial rear elevational of the tractor axle, power take-off, hydraulic pump, reservoirs and gang mower frame;

FIG. 8 is a side elevational view of a hydraulic fluid reservoir of FIG. 7;

FIG. 9 is an enlarged, partial, exploded view of one of the connections between the tractor axle and the mower support frame;

FIG. 10 is a schematic diagram of the hydraulic system for driving the mower reel motors, and FIG. 11 is a schematic diagram of the hydraulic circuit for the mower arm actuators.

DESCRIPTION OF THE PREFERRED EMBODIMENT

FIG. 1 shows the packaged gang mower assembly 11 of this invention which is intended to be attached to an industrial type tractor (not shown) having a rear drive axle 13 (FIG. 9). The mower assembly is particularly intended for use with reel mowers 14 of the type having front caster wheels 15 and a rear roller 16. For clarity of illustration only one of the reel mowers is shown in the assembly of FIG. 1. The packaged gang mower assembly includes a generally U-shaped frame 17 having longitudinally extending side members 19 and a cross end member 21 at the rear thereof. Diagonal members 23 (FIG. 6) are fastened to the forward ends of the side members 19. Plates 25 are attached to the forward ends of the diagonal members 23 and are equipped with bolt openings 27 to permit attachment of the forward end of the frame to mounting pads which are standard equipment on the tractor.

The side mower arms 43 are generally triangular in shape and include a base rod or tube 47 which is journalled in sleeves 49 fastened to the ends of the cantilever beams 39 and 41. Locking rings and bolts 51 (FIG. 5) at the ends of each tube 47 prevent disengagement of the tube from the sleeves 49. A cam 52 attached to the tube 47 at the forward end thereof actuates hydraulic fluid bypass valves to be described later. Mower arms 43 also include converging side members 53 which fasten to a plate 55 at the apex of each arm. A ball connector 57 (FIG. 2) mounted on a plate 58 attached to a mower 14 is fastened to plate 55 by a pin 59. A lug 60 welded on plate 58 engages plate 55 to limit rotational movement of the mower in a generally horizontal plane.

Hydraulic cylinders and pistons 61 are mounted on the frame 17 for raising and lowering the side mower support arms 43. Each hydraulic cylinder is pivotally connected to the end member 21 of the frame and the piston rod end of the cylinder is pivotally connected (FIG. 5) through means of a clevis 65 and pivot pin 67 to a lever 69. The lever is connected to a pin 71 which rotates in a sleeve 73 fastened to the underside of cantilever beam 41. The pivot pin 67 also restrains a second clevis 75, the open end of which receives a pivot pin 77 extending through an opening (not shown) in the free end of a lever 79 which in turn is attached to side mower arm 43.

As shown in FIGS. 1 and 3, three mower arms are pivotally mounted inside the frame 17. These arms rotate about a tube 85 which is journalled in sleeves 87 connected to the side members 19 by brackets 89. A pair of laterally spaced forward extending mower arms 91 have sleeves 93 at the bases thereof which fit over the tube 85. These arms include converging side members 95 which connect to an L-shaped plate 97 at the free ends thereof. A mower (not shown) is attached to each of the plates 97 through the use of ball connectors in the same manner as shown in FIGS. 1 and 2 for the attachment of the mower 14 to arm 43. A cross plate 99 extending between the side members 95 has an upstanding tab 101 attached thereto.

A rearwardly extending generally V-shaped mower arm 105 is also mounted on the tube 85 by means of sleeves 107 connected to the spaced ends of the legs 109 which form the arm. The opposite ends of the legs connect to a tab 111 at the apex of the V. The tab has an opening 112 which receives a pivot pin 113 to attach the tab to a mower connector bracket 114.

The operating mechanism for the mower arms 91 and 105 includes a hydraulic piston cylinder and piston rod assembly 117 (FIG. 1) which is pivotally mounted at one end, in this case the hydraulic cylinder end, to a side member 19 of the frame 17. The opposite end of the assembly, in this case the piston rod, is pivotally connected to the free end of a lever arm 123. The opposite end of the arm 123 is fastened to a sleeve 125 (FIG. 3) which in turn is fastened to the tube 85 on which the mower arms are mounted. Extending from the opposite side of this sleeve but somewhat less than diametrically from the arm 123 is a shorter arm 127. Fastened to the arm 127 and extending somewhat tangentially is a lift finger 129 which is positioned to engage a lug 131 attached to the arm member 109.

An angle 133 is connected to the end of arm 127 and a jack shaft 135 is pivotally connected to the free end of the angle. The opposite end of the jack shaft is pivotally connected to a bell crank 137 (FIG. 1) which is pivotally mounted on the side member 19 of the frame 17. A chain 141 connects at one end to the bell crank and at the opposite end to tab 101 of the mower arm 91. A similar arrangement of angle, jack shaft, bell crank and chain are provided to lift the other mower arm 91.

A sleeve 145 (FIG. 3) similar to sleeve 125 is fastened to tube 85 at the opposite end thereof. Arm 127 having a lift finger 129 is fastened to the sleeve with the finger engaging a lug 131 fastened to a support arm member 109.

Cantilevered beams 151 (FIG. 1) attached to the end member 21 extend outwardly and downwardly from the frame 17. Spaced lugs 153 attached to the free end of such beam 151 support a longitudinally aligned pivot pin 155. A sleeve 157 fits over the pivot pin and extends between the lugs 153. An arm 159 has a base portion 160 affixed to sleeve 157 for rotation therewith. A clevis 161 is attached to the outer end of the base portion 160 and carries a pivot pin 163 (FIG. 4). A sleeve 165 fits over pivot pin 163 and extends between the clevis. A stop member 167 is attached to the sleeve and engages the clevis to limit rotation of the sleeve in one direction.

An outer arm portion 171 is affixed to sleeve 165 for rotation therewith. A sleeve 172 (FIG. 4) telescopes over the outer end of the arm portion 171 and rotates thereon. The sleeve 172 is held in position by an inner ring 173 welded to arm portion 171 and an outer ring 174 secured thereto by a pin. Stops 175 and 176 are attached to arm 171 and sleeve 172 respectively and positioned to engage each other to limit rotation of the sleeve 172. A lug 177 extends from the sleeve and is formed with a pivot pin opening 178. The lug connects to a mower support bracket 179 by means of pivot pin 181. A combined stop and support 183 is attached to arm 159 and extends toward arm 171. The stop carries an arcuate support piece 185 which is equipped with an arcuate rubber liner 187. The stops 167 and 183 are located so as to limit the rotation of the outer arm portion 171 to an arc of approximately 60°.

A lever 191 (FIG. 1) is attached to sleeve 157 for rotation of each arm 159. The piston rod of a hydraulic cylinder and piston 193 is pivotally connected to lever 191. The hydraulic cylinder is pivotally connected to the frame end member 21.

Each reel mower 14 is driven by a hydraulic motor. Motors 201, 203 and 205 (FIG. 10) drive the mowers carried by the arms 91 and 105 which are mounted beneath the tractor. These three motors are arranged in a series circuit. The mowers carried by the outboard arms 43 and 171 are driven by hydraulic motors 207, 209, 211 and 213. These four motors are connected in series in a separate circuit. Cam actuated bypasses 215, 217, 219 and 221 are provided for the motors carried by the outboard arms to bypass hydraulic fluid for each motor when its arm is raised from the ground.

The two circuits containing the hydraulic motors are supplied with hydraulic fluid through a proportionator 223 which insures an equal flow of hydraulic fluid in each circuit. The hydraulic fluid is supplied to the proportionator by pump 225 which is driven by a speed increaser 227 (FIG. 7) attached to the tractor's power take-off 229. The flow from the pump to the proportionator is controlled by a three-way pressure compensated spool valve 231. The pump draws fluid from a reservoir 233 which is vented to the atmosphere. The return flow from the hydraulic motors enters an enclosed reservoir 235 which is connected to reservoir 233. The enclosed reservoir is equipped with baffles 236 to restrict the flow of fluid therethrough and built up a back pressure. The reservoirs are rectangular in cross-section and each has a slanting portion 239 (FIG. 8) on its rear wall to reduce the surface area of the reservoirs affected by trapped air. A weighted relief valve 241 discharged to reservoir 235 through a filter 243. A suction filter 245 for the pump 225 is located in reservoir 233.

The hydraulic circuit for the hydraulic cylinders and pistons 61, 117 and 193 which raise and lower the mower arms is shown in FIG. 11. The circuit is supplied with hydraulic fluid from the auxiliary service control valve (not shown) of the tractor's hydraulic system. The hydraulic cylinders and pistons 61 and 193 operating the arms 43 and 159 are each controlled by a four-way series — parallel spool valve 251. Each spool valve includes a floating position 253. A spring loaded relief valve 255 is provided for each cylinder to limit downward pressure on the mower arms when the mowers are being lowered to their operating positions. Hydraulic piston 117 operating the underside arms 91 and 105 is controlled by a three-way series — parallel spool valve 257. A pilot check valve 259 is provided to lock the piston in its retracted position for safe transport of the underside mowers. The spool valves are mounted on the stanchion 37 adjacent to the operator's seat.

The use, operation and function of the invention are is follows:

The frame 17 of the packaged gang mower assembly 11 of this invention is designed for ease of installation on a standard industrial tractor (not shown). Prior to the installation of the frame, the mower arms 43, spool valve support stanchion 37, diagonal members 23, and upwardly tilted cantilever beams 39 are removed from the frame. The frame is then slid under the rear drive axle 13 of the tractor, the cantilever beams 39 and diagonal members 23 are reconnected to the frame, and the plates 25 at the forward ends of the diagonal members 23 are connected by bolts extending through the openings 27 to mounting pads which are provided on industrial tractors for the attachment of accessories. In addition to the connections at the pads 25, the frame 17 is connected to the tractor axle 13 by means of bolts which extend through openings 33 formed in the drive axle 13 (FIG. 9). The bolts 31 also function to attach the tractor's fenders.

The mower arms 43 are then installed in the sleeves 49 attached to the outboard ends of the cantilever beams 39 and 41. Next, the mowers 14 are attached to their respective arms. Each reel mower has a connector which permits its attachment to its arm through the use of a single bolt and nut or pivot pin. The stanchion 37 is then bolted to the frame.

From the foregoing it can be seen that the frame 17 carrying the packaged gang mower is connected to the tractor at only four locations. Further, all of the hydraulic equipment including the hydraulic cylinders, reservoirs, pumps, etc. are carried by the frame and do not have to be separately supported on or attached to the tractor.

The hydraulic cylinders 61 and 193 used to raise and lower the outboard mower arms 43 and 159 are of the cushioned piston type. The load is greatest on a cylinder when it starts lifting the mower from its cutting positions. The load then lessens and becomes zero when the arm reaches its vertical position. The load becomes negative when the arm extends over center.

The hydraulic circuit for operating the outboard mower arm cylinders as well as cylinder 117 connects to the hydraulic system of the tractor through an auxiliary service control valve which is standard equipment on industrial tractors and is not shown in the drawings. This circuit is of the series — parallel type controlled by spool valves 251 and 257. Spool valves 251 which control the hydraulic cylinders 61 and 193 connected to the outboard arms each have a floating position 253. When a valve 251 is in its floating position there is no pressure applied against its hydraulic cylinder and piston. The hydraulic fluid flows back and forth through the valve as the arms follow their mowers as they move up and down over uneven ground. A floating position is not necessary on the spool valve 257 which controls hydraulic cylinder 117 for lifting the arms 91 and 105 because these arms are raised and lowered through lost motion connections.

Pump 225 connects to the power takeoff of the tractor through a speed increaser 227 which increases the power takeoff speed by a ratio of 3.1 to 1. The fluid from the pump passes through a proportionator 223 which assures an equal flow of fluid in each of the two hydraulic circuits connected to the pump, thereby guaranteeing that all of the reel mowers run at the same speed. The proportionator 223 is located in the hydraulic reservoir 235 to prevent overheating thereof.

Each of the hydraulic motors on the outboard reel mowers, that is the reel mowers attached to the arms 43 or 159, has a cam operated bypass to stop the motor when the reel mower is lifted off the ground by its arm. For example, the cam 52 carried on tube 47 of the right hand mower arm 43 will operate its cam bypass when this arm is lifted.

The first return reservoir 235 for the hydraulic motor circuits is not vented to the atmosphere but is sealed and contains baffles 236. The baffles restrict the return flow of hydraulic fluid through the reservoir thereby building up the pressure in the reservoir on the order of 3 to 4 pounds per square inch. The baffles break up the laminar flow of hydraulic fluid through the reservoir and prevent layers of cool hydraulic fluid from remaining in contact with the walls of the reservoir. This improves the cooling efficiency of the reservoir and permits the use of relatively small reservoirs, accordingly reducing the quantity of hydraulic fluid in the system and the overall weight of the system.

Reservoirs 233 and 235 each have a capacity of approximately 9 gallons. The hydraulic pump 225 has an output of 15 gallons per minute. Thus, the reservoir capacity is only slightly more than the rated output of the pump per minute. The front wall 239 of each reservoir is also slanted. This aids cooling by reducing the cross-sectional area of the top of the reservoir which is insulated by air trapped at the top thereof.

The novel connections of the reel mowers 14 to their lifting arms in combination with the ground engaging supports on the mowers enables the mowers to closely follow the undulations of the ground, both in and across their paths of travel even though the mowers are operated at relatively high speeds and are located considerable distances from the center line of the tractor. The novel connections are universal connections and the ground engaging supports include a pair of forwardly located caster wheels 15 and a rear ground engaging roller 16. Also, the hydraulic system and lifting mechanisms are arranged so that the arms do not exert either lifting or downward pressure on the mowers during cutting operations, other, of course, than the nominal weight of the arms resting on the mowers.

In the case of the outboard arms 43 and the underneath arms 91, the connections are ball connectors 57. The ball connector and the pivotal connection of the arm to the frame 11 provides practically universal movement of the mower relative to the tractor. The construction of the ball connector and lug 60 permit universal undulation of the mower relative to the arm within a range of approximately 15°. This is more than adequate to permit the mower to move unimpeded over almost any type of undulating ground encountered during grass cutting operations. Movement of the mowers relative to the arms beyond 15° during lifting operations is prevented by engagement of the plate 58 supporting the ball joint with the end plates 55 or 97 of the arms.

The rear outboard mowers 14 obtain the advantages of a universal connection through their pivotal attachment to the sleeves 172 which rotate relative to the outer arm portions 171 which in turn are pivotally connected to the upper arm portions 160 which are pivotally connected to the frame.

The rearly projecting underside arm 105 is connected to its mower by means of pin 113 which permits only very limited, if any, side to side movement or undulation of the mower relative to the tractor. However, since the mower attached to the arm 105 is located under the center line of the tractor, side to side undulations separate and apart from the movement of the tractor is generally not necessary. The small amount of undulation that may be necessary is obtained from normal bending of the support arm 105 or its connections to the frame 11.

The front caster wheels turn the mower in the direction of pull exerted by the arm while the roller function as a rudder to maintain stability of the mower. The arms function to pull the mowers in the direction of travel of the tractor, but the arms do not steer the mowers. Steering and stability of the mowers is accomplished by the caster wheels 15 and the rear roller 16.

The arms connect to the tops of the mowers at approximately the center of each mower. A connection at this location is advantageous in that the mower will not suddenly tilt to one side or the other when it is lifted. The mowers are free to follow the undulations of the ground both in the direction of the path of travel of the mower and across the path of travel and are not impeded by vertical movements of the tractor or the arms. Because of the universal connections, any bouncing or dropping of the mowers is not transmitted to the arms and is therefore not magnified.

During lifting, the mowers 14 attached to the rear outboard arms 159 are tilted upwardly through the operation of the stop members 175 and 176 which engage each other and prevent the sleeves 172 supporting the mower from swinging downwardly through an angle of more than about 15°. When tilted the mowers offer less obstruction during transport.

The mounting of the outboard rear mowers 14 on foldable arms 159 provides each mower with a greater radius of swing during turns, especially the mower located on the inside of the turn. This arrangement permits placement of the outboard mowers so as to eliminate uncut strips of grass during sharp turns. During turns, the outboard rear mowers are free to swing about arcs having a radius equal to the length of the outer arm portion 171. Thus, these mowers will automatically vary their distances from the tractor during turns in contrast with the other mowers which are located a fixed distance from the tractor at all times.

The amount of movement of a rear outboard mower during turns is limited by the engagement of the stop 167 with the clevis 161 in one direction and engagement with the stop 185 in the opposite direction. These stop members limit movement of the arm portions 171 to arcs of approximately 60°. During normal cutting operations, even in sharp turns, the amount of movement is such that the stops 167 and 185 will not come into play. The main purpose of the stops 167 is to prevent the mowers attached to the arms 159 from contacting the mowers attached to the arms 53 when the tractor is backed up. The stops 185 assist in lifting the outer arm portion 171 when the arm 159 is elevated. These stop also function to limit swinging movement of the arm portion 171 of the mower which is located on the outside of the turn.

The linkage arrangement provided for the side mower arms 43 (FIG. 5) enables the hydraulic cylinder and rod 61 to lift the arm 43 from an over center elevated position through the vertical and down below the horizon through an angle of almost 160°. Such an angular movement would not be possible with a single lever connected to the arm 43 because the rod of the cylinder 161 would engage the tube 47 of the arm after the arm 43 moved below the horizontal. Thus, the linkage provides a simplified way of providing a large arc of travel for the side mower arms 43.

Whereas, the preferred form of the invention has been described and shown, it should be understood that there are modifications, alterations and changes which may be made without departing from the teachings of the invention. Therefore, the scope of the invention should be only limited by the claims attached hereto.

We claim:
1. A hydraulically operated gang mower assembly for mounting on a tractor including:
 a generally U-shaped frame having the open portion thereof adapted to extend toward the front of said tractor,
 means to fasten the frame at the open end thereof to the tractor at a location forward of the rear drive axle of the tractor,
 means to suspend said frame from said rear drive axle of said tractor,
 a hydraulic circuit having means for connection to a source of hydraulic fluid under pressure,
 mower arms pivotally mounted on said frame and operated by hydraulic cylinders and pistons mounted on said frame and connected to said hydraulic circuit.
2. The gang mower assembly of claim 1 further characterized in that at least one of said mower arms extends forwardly relative to said tractor and is pivotally mounted on said frame for rotation about a transversely extending generally horizontal axis and at least one rearwardly extending mower arm is pivotally mounted on said frame for rotation about a transversely extending generally horizontal axis, and
 said forwardly and rearwardly extending mower arms are connected to a single hydraulic cylinder and piston for simultaneous operation.
3. The gang mower assembly of claim 2 further characterized in that one of said arms is connected to said cylinder and piston by means including a bell crank and a chain and the other of said arms is connected to said cylinder and piston by means including a lug attached to said mower support arm and a pivotal finger which engages said lug, said chain and said finger being arranged to provide lost motion connections between the piston and the mower arms.
4. The gang mower assembly of claim 1 further characterized in that at least one of said mower arms extends forwardly relative to said tractor and is pivotally mounted on said frame beneath said tractor for rotation about a transversely extending, generally horizontal axis and at least one of said mower arms extends rearwardly of said tractor and is pivotally mounted on said frame for rotation about the transversely extending, generally horizontal axis, said forwardly and rearwardly extending arms are connected to a single hydraulic cylinder and piston for simultaneous operation, a first pair of laterally spaced mower arms are attached to he frame, one on each side of said tractor with each arm being pivotally mounted for rotation about a separate longitudinally extending generally horizontal axis, a separate hydraulic cylinder and piston is provided in said circuit for raising and lowering each laterally spaced mower arm of said first pair, a second pair of laterally spaced mower arms are mounted on said frame and are located rearwardly of said tractor with each arm being pivotally mounted for rotation about a separate longitudinally extending, generally horizontal axis, a separate hydraulic cylinder and piston are provided in the circuit for raising and lowering each rearwardly located mower arm of said second pair, and all of said hydraulic cylinders and pistons are connected in said circuit in series and are extendable to lower said mower arms and are retractable to raise said mower arms.

5. The gang mower assembly of claim 4 further characterized by a lifting mechanism for each of said first pair of side mounted mower arms including:
a crank arm fastened to said arm adjacent the pivotal mounting of said arm,
a pivotally mounted lever located on the opposite side of said pivotal mounting from said arm,
a link connecting the free ends of said lever and said crank arm, and
a hydraulic piston rod connected to said lever.

6. The gang mower assembly of claim 4 further characterized in that said second pair of laterally spaced mower arms each includes a first member pivotally attached to said frame for rotation about a generally horizontal axis,
a second member pivotally connected to said first member at the free end thereof for rotation about an axis extending at right angles to said first member's pivotal axis,
means pivotally connecting said second member to a mower for rotation of said mower about the longitudinal axis of said second member and about an axis extending at right angles to said second member, and
stop means to limit folding movement of said second member relative to said first member.

7. A hydraulic drive assembly for a plurality of hydraulic motor operated reel mowers carried by a tractor having a power take-off, including:
a hydraulic pump driven by said power take-off,
at least two hydraulic fluid circuits connected to said hydraulic pump,
at least two of said hydraulic motors located in each of said circuits and connected in series in each of said circuits, and
means to provide an equal flow of hydraulic fluid in each circuit.

8. The hydraulic drive assembly of claim 1 further characterized in that said means to provide an equal flow of hydraulic fluid in each circuit is a proportionator.

9. The hydraulic drive assembly of claim 8 further characterized in that said hydraulic circuits discharge into at least one reservoir and said proportionator is located therein.

10. The hydraulic drive assembly of claim 7 further characterized in that said hydraulic circuits discharge to a first nonvented, internally baffled reservoir,
said first reservoir is connected to a second reservoir which is atmospherically vented, and
said means to provide an equal flow of hydraulic fluid in each circuit is a proportioner which is located in said first reservoir.

11. The hydraulic drive assembly of claim 10 further characterized in that sufficient baffles are positioned in said first reservoir to create back pressure due to the return of hydraulic fluid from the circuits on the order of at least several pounds per square inch.

12. The hydraulic drive assembly of claim 10 further characterized in that each of said reservoirs has at least one sloping wall to reduce the cross-sectional area of the top surface thereof.

13. The gang mower assembly of claim 11 further characterized in that the total fluid capacity of said nonvented and vented reservoirs is slightly greater than the total rated output per minute of said hydraulic pump.

14. Apparatus for mounting a power driven mower on a vehicle to allow the mower to closely follow undulations of the ground during cutting operations, said apparatus including:
an arm,
means for connecting one end of said arm to a vehicle for rotation of said arm about a generally horizontal axis,
means for connecting a power driven mower to the free end of said arm to provide said mower with universal rotation and tilting movement about three mutually perpendicular axes with said movement about said axes being at least sufficient to enable the mower to follow undulations of the type normally encountered while cutting grass, and
ground engaging means on said mower for supporting and steering the mower during grass cutting operations.

15. The apparatus of claim 14 in which said means connecting said mower to said arm is a ball connector.

16. The apparatus of claim 14 further characterized in that said ground engaging means includes a pair of caster wheels at the front of said mower and a roller at the rear of the mower.

17. The apparatus of claim 16 further characterized in that said power driven mower is a reel mower.

* * * * *